US011539096B2

(12) United States Patent
Syed et al.

(10) Patent No.: US 11,539,096 B2
(45) Date of Patent: Dec. 27, 2022

(54) LIPPED RETENTION MEMBER FOR RETAINING A BATTERY ARRAY AND RETENTION METHOD USING LIPPED RETENTION MEMBER

(71) Applicant: Ford Global Technologies, LLC, Dearborn, MI (US)

(72) Inventors: Shamsuddin A. Syed, Canton, MI (US); Rajaram Subramanian, Ann Arbor, MI (US); Ihab Grace, Grosse Pointe Woods, MI (US); James Maurice Boileau, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 16/983,972

(22) Filed: Aug. 3, 2020

(65) Prior Publication Data

US 2022/0037630 A1    Feb. 3, 2022

(51) Int. Cl.
*H01M 50/244*    (2021.01)
*H01M 50/20*    (2021.01)
*H01M 50/264*    (2021.01)
*H01M 50/249*    (2021.01)
*H01M 50/209*    (2021.01)

(52) U.S. Cl.
CPC ......... *H01M 50/244* (2021.01); *H01M 50/20* (2021.01); *H01M 50/209* (2021.01); *H01M 50/249* (2021.01); *H01M 50/264* (2021.01); *H01M 2220/20* (2013.01)

(58) Field of Classification Search
None
See application file for complete search history.

(56) References Cited

U.S. PATENT DOCUMENTS 9,636,984 B1    5/2017    Baccouche et al.
2012/0263988 A1*  10/2012   Obasih ................. B60L 50/66
                                                429/98

(Continued)

FOREIGN PATENT DOCUMENTS

WO    2019130937    7/2019

OTHER PUBLICATIONS www.britannica.com dictionary definition of the term secure. (Year: unknown).*

(Continued)

*Primary Examiner* — Gregg Cantelmo
(74) *Attorney, Agent, or Firm* — David B. Kelley; Carlson, Gaskey & Olds, P.C.

(57) ABSTRACT

A battery assembly includes, among other things, an enclosure having a floor, and battery cell frames disposed along an axis within the enclosure. Each of the battery cell frames includes a frame foot that projects laterally outward. An endplate is at an axial end of the battery cell frames. The endplate includes an endplate retention flange that projects laterally outward to laterally overlap with a portion of the retention member. A retention member extends axially alongside the battery cell frames. The retention member includes a lip that projects laterally inward across the frame feet such that the frame feet are held between the lip and the floor. An axial end portion of the retention member is secured directly to the endplate retention flange.

17 Claims, 5 Drawing Sheets

(56) References Cited

U.S. PATENT DOCUMENTS

| | | | |
|---|---|---|---|
| 2012/0312614 A1* | 12/2012 | Fujiwara | H01M 50/20 |
| | | | 180/68.5 |
| 2014/0145539 A1* | 5/2014 | Huang | H02K 1/2766 |
| | | | 310/156.53 |
| 2016/0133895 A1* | 5/2016 | Subramanian | B60L 50/64 |
| | | | 29/623.1 |
| 2017/0174160 A1* | 6/2017 | Uraguchi | B60R 16/04 |
| 2018/0269441 A1 | 9/2018 | Yum et al. | |
| 2019/0081297 A1* | 3/2019 | Nakamori | B60L 50/64 |

OTHER PUBLICATIONS www.thefreedictionary.com dictionary definition of the term securing. (Year: unknown).*

* cited by examiner

LIPPED RETENTION MEMBER FOR RETAINING A BATTERY ARRAY AND RETENTION METHOD USING LIPPED RETENTION MEMBER

TECHNICAL FIELD

This disclosure relates generally to retaining a battery array within an enclosure of a traction battery pack and, more particularly, to retaining the battery array using a retention member having a lip. The retention member can be an extruded retention member.

BACKGROUND

Electrified vehicles differ from conventional motor vehicles because electrified vehicles are selectively driven using one or more electric machines powered by a traction battery pack. The electric machines can drive the electrified vehicles instead of, or in addition to, an internal combustion engine. A traction battery pack of an electrified vehicle can include one or more battery arrays with an enclosure.

SUMMARY

A battery assembly according to an exemplary aspect of the present disclosure includes, among other things, an enclosure having a floor, and battery cell frames disposed along an axis within the enclosure. Each of the battery cell frames includes a frame foot that projects laterally outward. An endplate is at an axial end of the battery cell frames. The endplate includes an endplate retention flange that projects laterally outward to laterally overlap with a portion of the retention member. A retention member extends axially alongside the battery cell frames. The retention member includes a lip that projects laterally inward across the frame feet such that the frame feet are held between the lip and the floor. An axial end portion of the retention member is secured directly to the endplate retention flange.

Another example of the foregoing assembly includes a mechanical fastener that extends through an aperture in the endplate retention flange and is at least partially received within a bore provided by the retention member.

In another example of any of the foregoing assemblies, the bore opens to an axially facing surface of the retention member. The endplate retention flange is positioned against the axially facing surface.

In another example of any of the foregoing assemblies, the bore is a threaded bore.

In another example of any of the foregoing assemblies, the retention member is an extruded retention member.

In another example of any of the foregoing assemblies, the battery cell frames each hold at least a portion of a battery cell.

Another example of any of the foregoing assemblies includes first fasteners that each extend vertically downward through a respective retention member bore in the retention member to engage a respective second fastener that is secured relative to the floor. The first fasteners engage the second fasteners to secure the retention member to the floor.

In another example of any of the foregoing assemblies, the second fastener is a weld nut.

In another example of any of the foregoing assemblies, the second fastener is secured relative to the floor by a bracket.

In another example of any of the foregoing assemblies, the endplate is a first endplate at a first axial end of the plurality of battery cell frames. The assembly then further includes a second endplate at an opposite, second axial end of the battery cell frames. The retention member extends from the endplate retention flange of the first endplate to an endplate retention flange of the second endplate. The retention member is secured directly to the endplate retention flange of the second endplate.

Another example of any of the foregoing assemblies includes a tensioning rod that extends from the first to the second endplate to compress the battery cells frames axially between the first and second endplates. The lip projects laterally inward to laterally overlap with at least a portion of the tensioning rod.

In another example of any of the foregoing assemblies, the tensioning rod extends through apertures in the frame feet of the plurality of battery cell frames.

A method of retaining according to another exemplary aspect of the present disclosure includes, among other things, providing battery cell frames disposed along an axis within an enclosure. Each of the battery cell frames includes a frame foot that projects laterally outward. The method further includes holding the battery frames relative to a floor of the enclosure using a retention member extending axially alongside of the battery frames. The retention member includes a lip that projects laterally inward across the frame feet such that the frame feet are held between the lip and a floor of the enclosure. The method still further includes securing an axial end portion of the retention member directly to an endplate retention flange of an endplate that is disposed at an axial end of the plurality of battery cell frames. The endplate retention flange projects laterally outward to laterally overlap with a portion of the retention member.

Another example of the foregoing method includes securing the endplate retention flange directly to the axial end portion of the retention member using a mechanical fastener that extends through an aperture in the endplate retention flange to engage a bore provided by retention member. The bore opens to an axially facing surface of the retention member.

In another example of any of the foregoing methods, the retention member is an extruded retention member.

In another example of any of the foregoing methods, the battery cell frames each hold at least a portion of a battery cell.

In another example of any of the foregoing methods, the endplate is a first endplate at a first axial end of the plurality of battery cells frames. The method further includes using a tensioning rod to axially compress the battery cell frames between the first endplate and a second endplate that is at a second, opposite axial end of the battery cell frames.

Another example of any of the foregoing methods includes securing the retention member directly to both the endplate retention flange of the first endplate and an endplate retention flange of the second endplate.

In another example of any of the foregoing methods, the lip projects laterally inward to laterally overlap with at least a portion of the tensioning rod.

In another example of any of the foregoing methods, the tensioning rod extends through apertures in the frame feet of the plurality of battery cell frames.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details assemblies and methods associated with retaining a battery array of a traction battery pack. The retaining strategies utilize a retention member having a lip. The retention member can be an extruded retention member. In some traction battery packs, the retention member can be secured relative to an enclosure, and opposing axial ends of the retention member secured directly to endplates of the battery array. In other traction battery packs, an axially shorter variation of the retention member can be secured relative to an enclosure, without securing the retention member directly to the endplates of the battery array.

Figure 1:
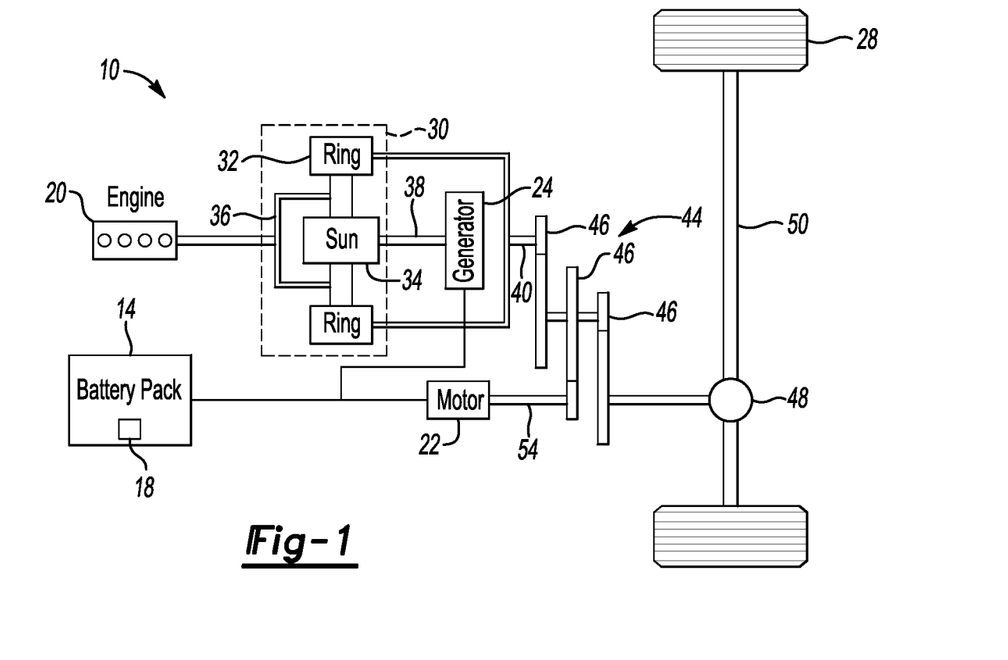
FIG. 1 illustrates a schematic view of an example powertrain of an electrified vehicle.

Referring to FIG. 1, a powertrain 10 of a plug-in hybrid electric vehicle (PHEV) includes a battery pack 14 having at least one battery array 18, an internal combustion engine 20, a motor 22, and a generator 24. The motor 22 and the generator 24 are types of electric machines. The motor 22 and generator 24 may be separate or have the form of a combined motor-generator.

Although depicted as a PHEV, it should be understood that the concepts described herein are not limited to PHEVs and could extend to battery packs in any other type of electrified vehicle, including, but not limited to, other hybrid electric vehicles (HEVs), battery electric vehicles (BEVs), fuel cell vehicles, etc.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14. The motor 22 can be driven with electrical power from the battery pack 14. As the battery pack 14 can provide motive power within the powertrain 10, the battery pack 14 can be considered a traction battery pack.

Figure 2:
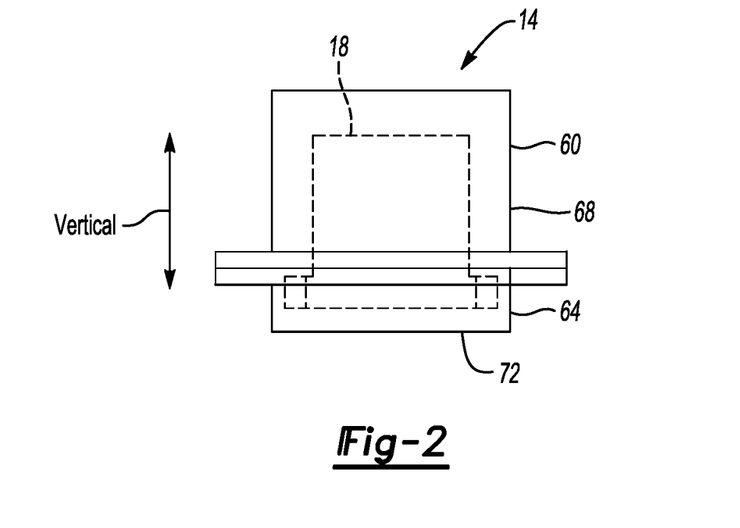
FIG. 2 illustrates a side view of a battery pack from the powertrain of FIG. 1.
Figure 3:
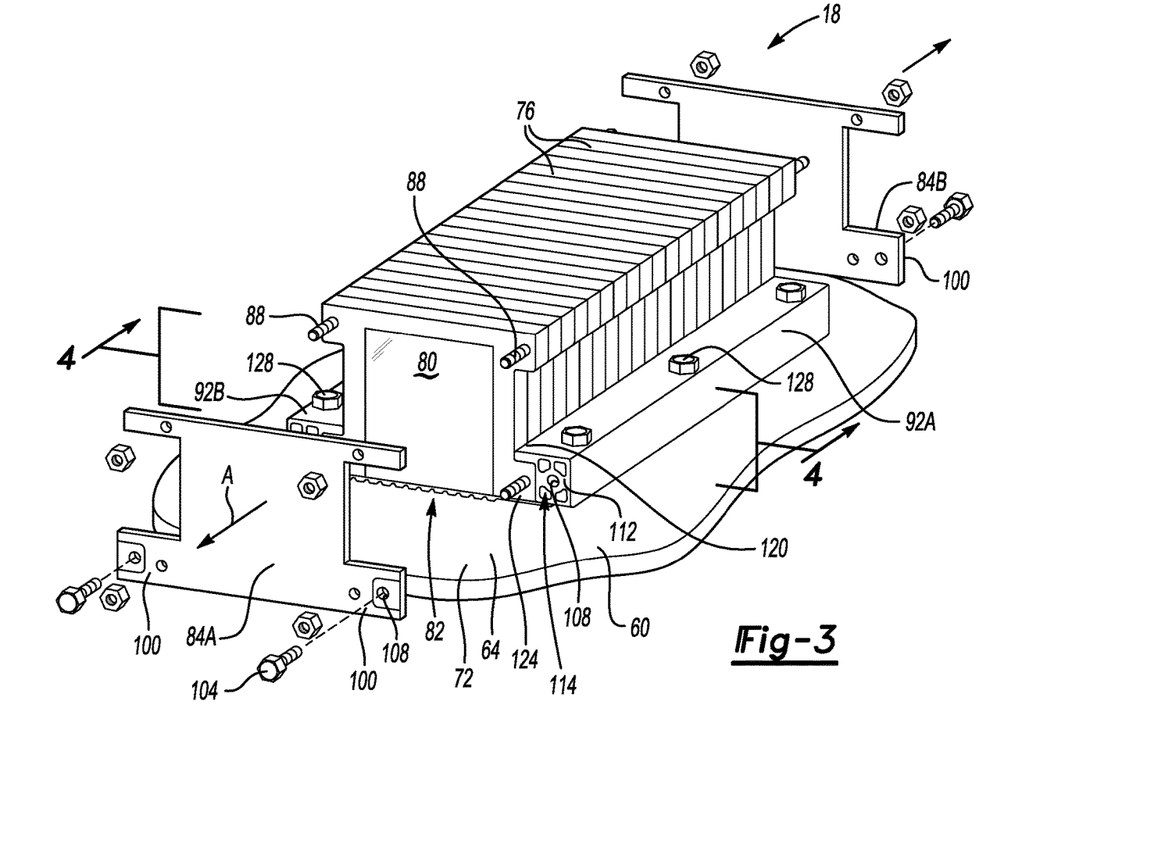
FIG. 3 illustrates a perspective, partially expanded view of a battery array secured within the battery pack of FIG. 2.
Figure 4:
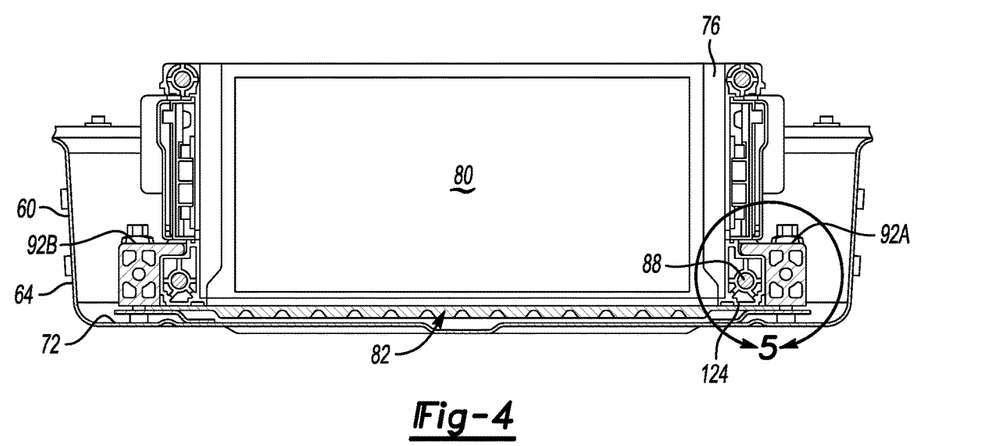
FIG. 4 illustrates a section view taken at line 4-4 in FIG. 3.
Figure 5:
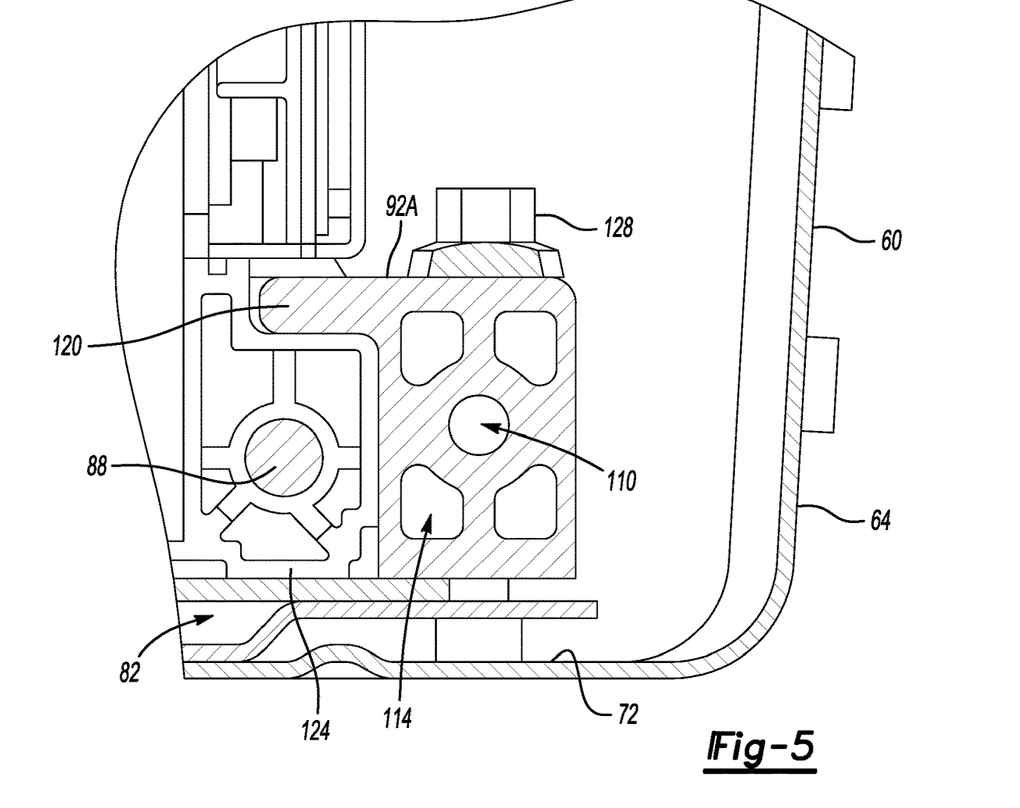
FIG. 5 illustrates a close-up view of an area within FIG. 4.
Figure 6:
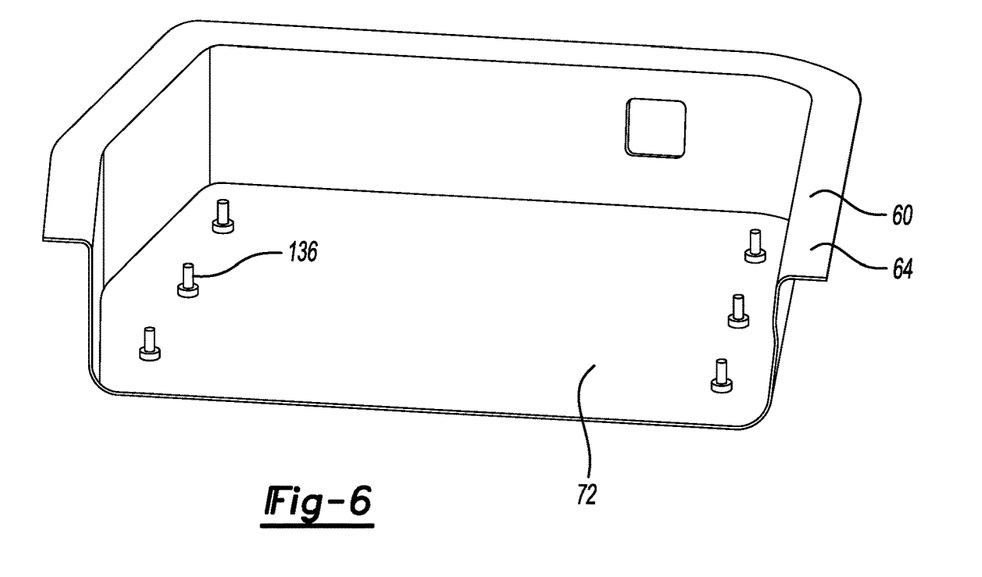
FIG. 6 illustrates a sectioned, perspective view of the battery pack of FIG. 2.
Figure 7:
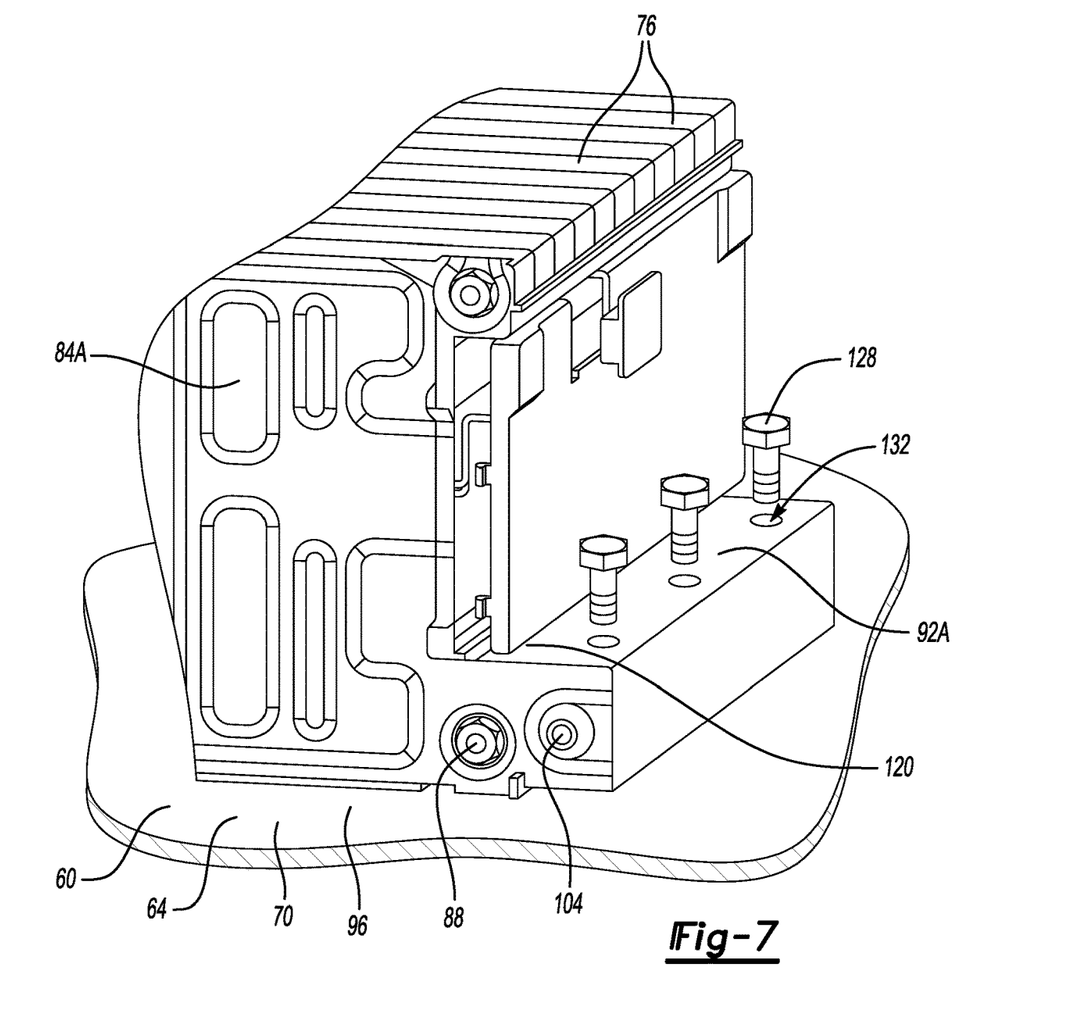
FIG. 7 illustrates an assembled partial end view of the battery array of FIG. 3 secured within the battery pack.

Referring now to FIG. 2, the battery pack 14, in the exemplary embodiment, includes an enclosure 60 housing the battery array 18. The enclosure 60 could house more than one battery array 18 in other examples.

The enclosure 60 includes a tray 64 fastened to a lid 68. The tray 64 is a metal or metal alloy in this example. Within the enclosure 60, the battery array 18 is supported on the tray 64, and, in particular, a floor 72 of the tray 64. The floor 72 is at a vertical bottom of the tray 64. Vertical, for purposes of this disclosure is with reference to ground and an ordinary orientation of the battery pack 14 when installed within a vehicle.

With reference now to FIGS. 3-7, the battery array 18 includes a plurality of battery cell frames 76 disposed along an axis A. Each of the battery cell frames 76 holds at least a portion of a battery cell 80. The frames 76 extend circumferentially about a periphery of a respective one or more of the battery cells 80.

The battery array 18 further includes a thermal exchange device 82, a pair of endplates 84A, 84B, and a plurality of tensioning rods 88. Retention members 92A, 92B are used to secure the battery array 18 within the enclosure 60.

Fluid is circulated through channels of the thermal exchange device 82 between the floor 72 and the battery cells 80. The fluid can be used to exchange thermal energy with the battery cells 80 to control thermal energy levels of the battery cells 80. The thermal exchange device 82 is positioned vertically between the battery cells 80 and the floor 72 of the tray 64 in this example.

The endplates 84A, 84B are disposed at opposing axial ends of the battery cell frames 76 and battery cells 80. The tensioning rods 88 extend axially from the endplate 84A to the endplate 84B. The tensioning rods 88 are connected to the endplates 84A, 84B. The tensioning rods 88 can pull the endplates 84A, 84B together axially to compress the battery cell frames 76 and battery cells 80 axially.

The retention members 92A and 92B are disposed on opposing lateral sides of the battery cell frames 76 and battery cells 80. The retention members 92A and 92B each extend axially from the endplate 84A to the endplate 84B.

The endplates 84A, 84B each include endplate retention flanges 100 that project laterally outward from the remaining portions of the endplates 84A, 84B. The endplate retention flanges 100 each project laterally outward enough to laterally overlap with at least a portion of the retention member 92A or the retention member 92B.

A mechanical fastener 104 extends through an aperture 108 in one of the endplate retention flanges 100 of the endplate 84A and engages the retention member 92A. The mechanical fastener 104 directly connects the endplate retention flange 100 of the endplate 84A to the retention member 92A.

The retention member 92A includes a bore 110 extending along a length of the retention member 92A. At the axial end of the retention member 92A that directly connects to the endplate retention flange 100 of the endplate 84A, the bore 110 opens to an axially facing surface 112 of the retention member 92A. Circumferentially distributed about the bore 110 are a plurality of other bores 114 that also extend axially along a length of the retention member 92A and open to the axially facing surface 112. The retention member 92A includes four of the other bores 114, which have a triangular cross-sectional profile. Incorporating the bore 110 and the bores 114 into the retention member 92A can reduce an overall weight of the retention member 92A.

The mechanical fastener 104 can extend through the aperture 108 of the endplate retention flange 100 of the endplate 84A and into the bore 110 when securing the endplate retention flange 100 of the endplate 84A to the retention member 92A. Within the bore 110, which may be threaded, the mechanical fastener 104 can threadably engage the retention member 92A to secure the endplate retention flange 100 of the endplate 84A directly to the retention member 92A. In the exemplary embodiment, the endplate retention flange 100 of the endplate 84A is positioned directly against, and in contact with, the axially facing surface 112 of the retention member 92A.

The connection strategy described above can be replicated to connect the other endplate retention flange 100 of the endplate 84A to the retention member 92B. At the opposite axial end of the battery array 18, the connection strategy described above can be replicated to connect the endplate retention flanges 100 of the endplate 84B to the respective retention members 92A or 92B.

The retention members 92A and 92B are used to retain the battery array 18. In the exemplary embodiment, the retention members 92A and 92B each include a lip 120 that projects laterally inward. As the retention members 92A and 92B each include the lip 120, the retention members 92A and 92B can each be considered lipped retention members. The battery cell frames 76 include frame feet 124 that project laterally outward from opposing lateral sides of the battery cell frames 76.

When the retention members 92A is retaining the battery cell frames 76, the lip 120 of the retention member 92A projects laterally inward across an upper surface of the frame feet 124 such that the frame feet 124 on a first lateral side of the battery cell frames 76 are held vertically between the lip 120 and the floor 72 of the tray 64.

The lip 120 projects laterally inward far enough, in this example, to laterally overlap with at least a portion of one of the tensioning rods 88. In this example, the lip 120 of the retention member 92A laterally overlaps with at least a portion of the tensioning rod 88 that extends through apertures in the frame feet 124 on the first lateral side of the battery cell frames 76.

The retention member 92A can be secured relative to the floor 72 by a plurality of first fasteners 128 that extend downward through retention member bores 132 provided within the retention member 92A. The retention member bores 132 can be establish using a machining process after the remaining portions of the retention member 92A are extruded.

The first fasteners 128, here bolts, can each engage respective second fasteners 136 extending upward from the floor 72. The second fasteners 136 can be attached (e.g., welded) directly to the floor 72. The second fasteners 136 can each include internally threaded boss. The second fasteners 136 are weld nuts in an exemplary embodiment. In another example, the second fasteners 136 are clinch nuts.

During assembly, the second fasteners 136 can be secured relative to the floor 72. Next, the battery array 18 is positioned within the enclosure 60. The retention members 92A and 92B can then be moved downward and the second fasteners 136 received each received within a respective one of the retention member bores 132. The first fasteners 128 are then secured to the second fasteners 136 to secure the retention members 92A and 92B relative to the enclosure 60, which retains the battery array 18 relative to the enclosure 60.

The threadable engagement of the first fasteners 128 with the second fasteners 136 anchors the retention member 92A relative to the floor 72. As the lip 120 extends over the top of the frame feet 124, the anchoring of the retention member as secures the position of the frame feet 124 and thus the battery cell frames 76 and battery cells 80 of the battery array 18. The retention members 92A and 92B then "ride on" at least the frame feet 124 of the battery cell frames 76.

Rather than attaching directly to the floor 72, the second fasteners 136 could, in another example, be secured relative to the floor 72 using a bracket 138 (FIG. 8), which is attached the floor 72. The second fasteners 136 could, for example, each include an enlarged head that is captured within an open area 140 vertically between the bracket 138 and the floor 72. Each of the second fasteners 136 includes an internally threaded boss 142 that extends upward through an aperture in the bracket 138. The first fasteners 128 can then engage the internally threaded boss 142 when securing the first fasteners 128 to the second fasteners 136. The enlarged head prevents the second fasteners 136 from withdrawing upward through the apertures in the bracket 138 during the engaging. In another embodiment, the second fasteners 136 could be welded directly to the bracket 138 that is attached to the floor 72.

In the exemplary embodiment, the retention members 92A and 92B are extruded retention members that are a metal or metal alloy material. A person having skill in this art would understand how to structurally distinguish a component that is extruded from another component that is not extruded. Thus, specifying that the retention members 92A and 92B are extruded retention members implicates structure to the retention members 92A and 92B, and structurally distinguishes the retention members 92A and 92B from components that are not extruded.

During an extrusion process, material can be pushed through a die having a desired cross-section, the material with the desired cross-section can then be cut to a desired axial length to provide the retention member 92A or 92B. The retention member 92A is nominally geometrically the same as the retention member 92B. Here, the desired cross-section has an inverted L-shaped profile.

Figure 9:
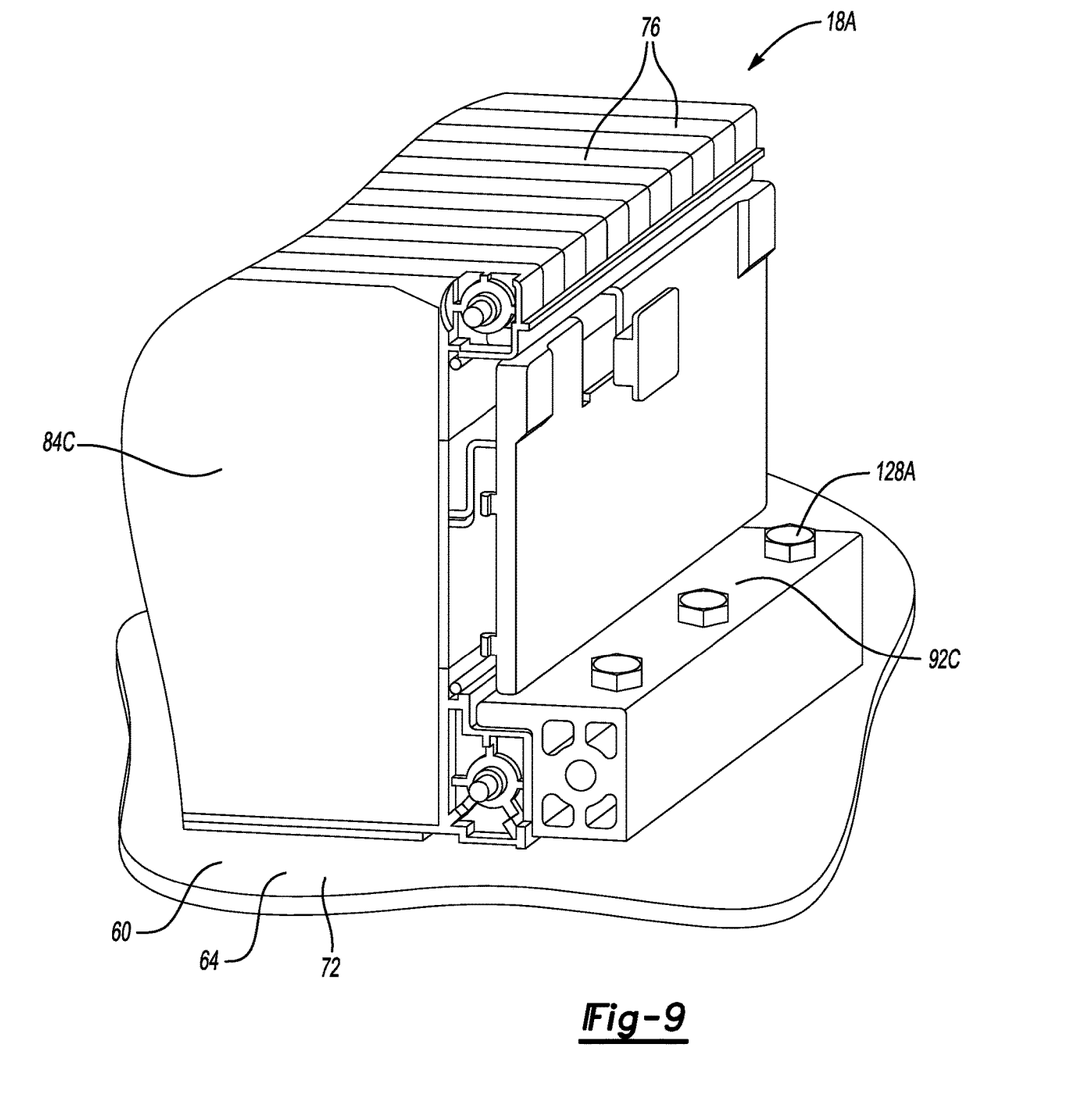
FIG. 9 illustrates a battery array secured within a battery pack according to another exemplary embodiment of the present disclosure.

With reference to FIG. 9, some battery arrays, such as the battery array 18A, have a shorter axial length than the battery array 18 of FIGS. 2-7. In the battery array 18A, the same extrusion process and same cross-section can be utilized to provide a retention member 92C. Material that has been pushed through the die is cut to a shorter length to provide the retention member 92C than when providing the retention members 92A and 92B in the battery array 18 of the FIGS. 2-7 embodiment.

As shown, an endplate 84C of the battery array 18A does not include endplate retention flanges laterally overlapping axially facing surfaces of the retention member 92C. In the battery array 18A, the retention member 92C is not fastened directly to the endplate 84C. Instead, the retention member 92C retains the battery array 18C relative to the floor 72 of the tray 64 of the enclosure 60 via mechanical fasteners 128A that extend vertically downward to engage corresponding threaded fasteners secured relative to the floor 72.

Figure 8:
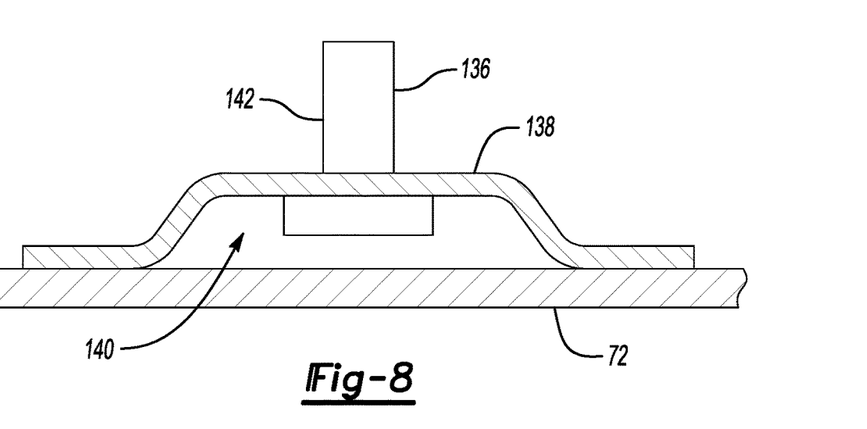
FIG. 8 illustrates a bracket secured to a floor of a battery pack enclosure according to another exemplary embodiment of the present disclosure.

Securing the retention member 92C to the endplate 84C of the shorter battery array 18C is not required in this example as the overall axial length of the battery array 18A makes the potential for relative movement of the battery array 18A along the axis A relative to the retention member 92C less likely. In the example of FIG. 8, a corresponding retention member, not shown) would be disposed on an opposite lateral side of the battery array 18A.

Some features of some of the disclosed embodiments include a drop in retention member that is extruded and can be used to retain a battery array within an enclosure. The use of a separate side rail assembly may not be required for retention. Part count and complexity is thereby reduced. Using an extruded retention member can save costs associated with providing a retention member that is stamped. The extruded retention member can reduced costs and complexity as the same cross-section can be used for various battery packs having different axial lengths.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery assembly, comprising:
   an enclosure having a floor;
   a plurality of battery cell frames disposed along an axis within the enclosure, each battery cell frame including a frame foot that projects laterally outward;
   a retention member extending axially alongside the plurality of battery cell frames;
   an endplate at an axial end of the plurality of battery cell frames, the endplate including an endplate retention flange that projects laterally outward to laterally overlap with a portion of the retention member,
   the retention member including a lip that projects laterally inward across the frame feet such that the frame feet are held between the lip and the floor, the retention member including an axial end portion that is secured directly to the endplate retention flange; and
   a mechanical fastener that extends axially through an aperture in the endplate retention flange and is at least partially received within a bore provided by the retention member,
   wherein the bore opens to an axially facing surface of the retention member, the axially facing surface facing axially along the axis of the plurality of battery cell frames, the endplate retention flange positioned against the axially facing surface.

2. The battery assembly of claim 1, wherein the bore is a threaded bore.

3. The battery assembly of claim 1, wherein the retention member is an extruded retention member.

4. The battery assembly of claim 1, wherein the battery cell frames each hold at least a portion of a battery cell.

5. The battery assembly of claim 1, further comprising a plurality of first fasteners that each extend vertically downward through a respective retention member bore in the retention member to engage a respective second fastener that is secured relative to the floor, the first fasteners engaging the second fasteners to secure the retention member to the floor.

6. The battery assembly of claim 5, wherein the second fasteners are each a weld nut.

7. The battery assembly of claim 5, wherein the second fasteners are each secured relative to the floor by a floor retention member.

8. The battery assembly of claim 1, wherein the endplate is a first endplate at a first axial end of the plurality of battery cell frames and further comprising a second endplate at an opposite, second axial end of the battery cell frames, the retention member extending from the endplate retention flange of the first endplate to an endplate retention flange of the second endplate, the retention member secured directly to the endplate retention flange of the second endplate.

9. The battery assembly of claim 8, further comprising a tensioning rod that extends from the first to the second endplate to compress the battery cells frames axially between the first and second endplates, wherein the lip projects laterally inward to laterally overlap with at least a portion of the tensioning rod.

10. The battery assembly of claim 9, wherein the tensioning rod extends through apertures in the frame feet of the plurality of battery cell frames.

11. A method of retaining, comprising:
   providing a plurality of battery cell frames disposed along an axis within an enclosure, each frame within the plurality of frames including a frame foot that projects laterally outward;
   holding the plurality of battery frames relative to a floor of the enclosure using a retention member extending axially alongside of the plurality of battery frames, the retention member including a lip that projects laterally inward across the frame feet such that the frame feet are held between the lip and a floor of the enclosure;
   securing an axial end portion of the retention member directly to an endplate retention flange of an endplate that is disposed at an axial end of the plurality of battery cell frames, the endplate retention flange projecting laterally outward to laterally overlap with a portion of the retention member; and
   securing the endplate retention flange directly to the axial end portion of the retention member using a mechanical fastener that extends through an aperture in the endplate retention flange to engage a bore provided by retention member, the bore opening to an axially facing surface of the retention member, wherein the axially facing surface faces axially along the axis of the plurality of battery cell frames.

12. The method of claim 11, wherein the retention member is an extruded retention member.

13. The method of claim 11, wherein the battery cell frames each hold at least a portion of a battery cell.

14. The method of claim 11, wherein the endplate is a first endplate at a first axial end of the plurality of battery cells frames, and further comprising using a tensioning rod to axially compress the battery cell frames between the first endplate and a second endplate that is at a second, opposite axial end of the battery cell frames.

15. The method of claim 14, further comprising securing the retention member directly to both the endplate retention flange of the first endplate and an endplate retention flange of the second endplate.

16. The method of claim 14, wherein the lip projects laterally inward to laterally overlap with at least a portion of the tensioning rod.

17. The method of claim 14, wherein the tensioning rod extends through apertures in the frame feet of the plurality of battery cell frames.

* * * * *